United States Patent [19]
Weinstein

[11] 4,453,074
[45] Jun. 5, 1984

[54] PROTECTION SYSTEM FOR INTELLIGENT CARDS

[75] Inventor: Stephen B. Weinstein, Summit, N.J.

[73] Assignee: American Express Company, New York, N.Y.

[21] Appl. No.: 312,705

[22] Filed: Oct. 19, 1981

[51] Int. Cl.³ .............................................. G06K 5/00
[52] U.S. Cl. .................................. 235/380; 235/381; 235/382
[58] Field of Search .............. 235/379, 380, 381, 382; 178/22.08; 340/825.32

[56] References Cited
U.S. PATENT DOCUMENTS 4,288,659 9/1981 Atalla ............................ 235/380 X

*Primary Examiner*—Harold I. Pitts
*Attorney, Agent, or Firm*—Gottlieb, Rackman and Reisman

[57] ABSTRACT

There is disclosed a protection system for intelligent cards. Each card has stored in it a code which is the encryption of a concatenation of a user secret password and a common reference text. The encryption is derived by an initialization terminal which uses the private key associated with the public key of a public-key cryptosystem key pair. Each transaction terminal with which a card is used decrypts the stored code in accordance with the public key. A transaction is effected only if the stored code decrypts into the user password which is inputted on a keyboard and the common reference text.

19 Claims, 8 Drawing Figures

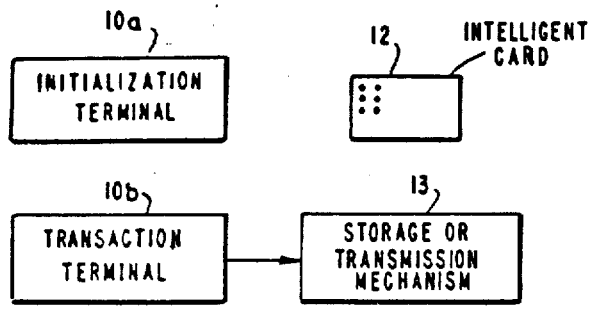
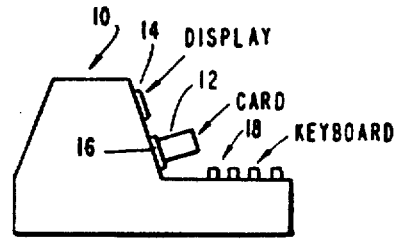
FIG. 1
FIG. 2
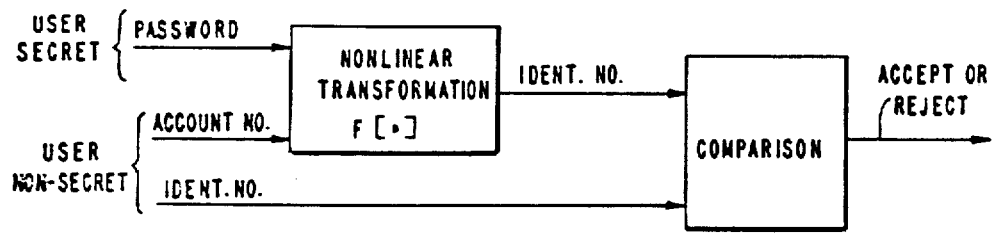
FIG. 3A
PRIOR ART
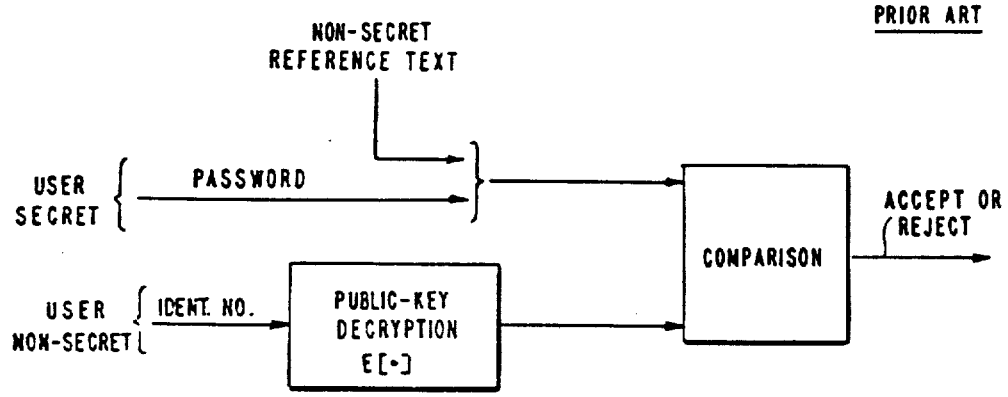
FIG. 3B

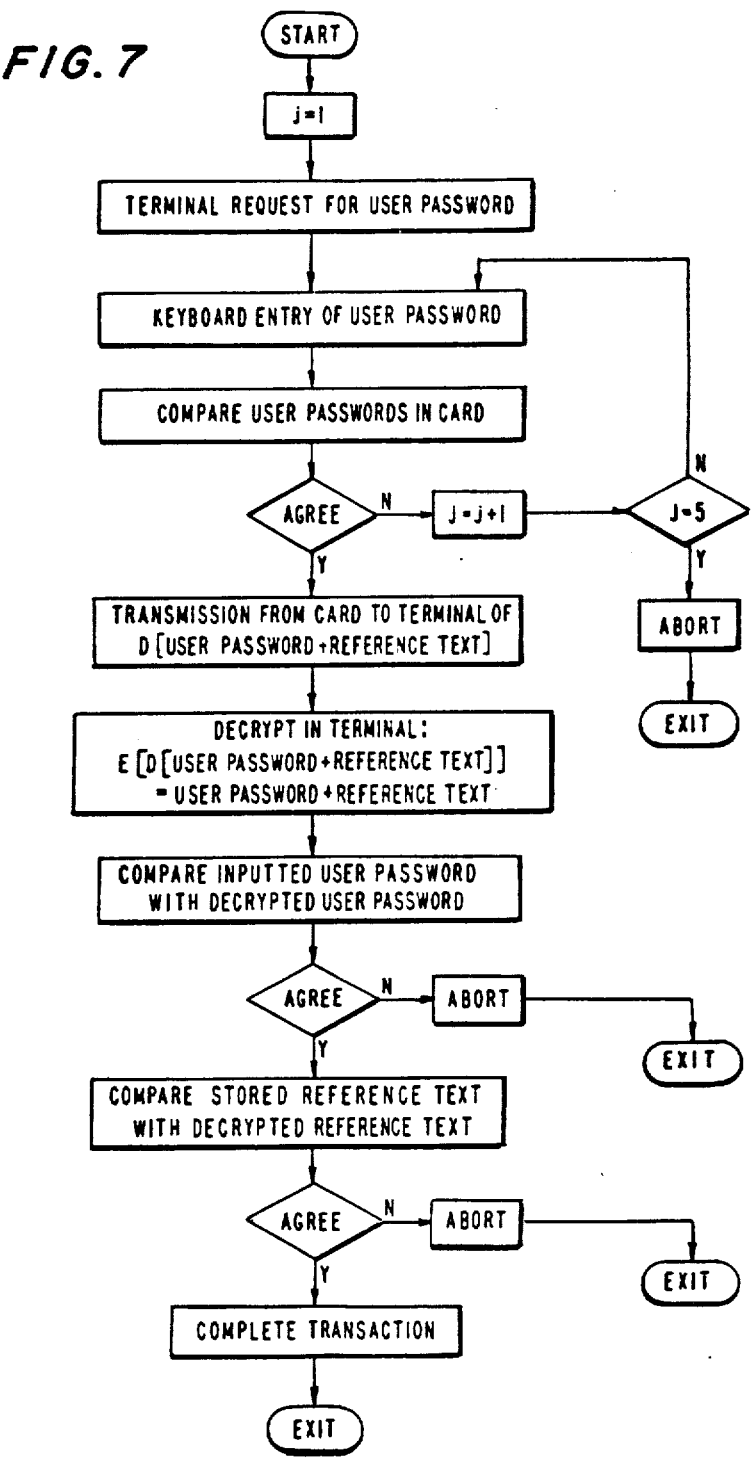

PROTECTION SYSTEM FOR INTELLIGENT CARDS

DESCRIPTION

BACKGROUND OF THE INVENTION

This invention relates to the use of intelligent cards to effect terminal transactions, and more particularly to the prevention of the fraudulent use of such cards.

Much work has been done in recent years on the furnishing of intelligent cards, of the "credit card" type, to consumers; such intelligent cards include a memory and have a data processing capability, the latter being in hard-wired form or more preferably in the form of a microprocessor with a stored program. (Although developments thus far are in the form of cards, it is to be understood that a small memory and microprocessor can be incorporated in other portable media, such as pens, keys, etc.; as used herein, the term "intelligent card" refers to any medium which can be conveniently carried by a user and which performs the functions to be described below.) Much of the work on intelligent cards has been performed abroad, particularly in France, and a prior art patent illustrating the general concept is that of Michel Ugon, U.S. Pat. No. 4,211,919, issued on July 8, 1980 and entitled "Portable Data Carrier Including A Microprocessor".

A typical intelligent card might contain a personal identification number, i.e., a secret password, as well as a dollar value. (The term "password", as used herein, refers to either a memorized sequence of symbols or a set of numerical data derived from physiological attributes, such as a signature, voice sample or fingerprint, of the legitimate card user.) The card issuer might initially store a value in the card representing $500, upon payment of this amount by the user. Whenever the card is used in a purchase transaction, the value of the transaction is subtracted from the value remaining on the card, the new value representing the available user credit. Before any transaction takes place, the card is placed in a terminal and the user is required to input his password. (If the password is a derivate of physiological attributes, "input his password" should be understood to mean supply a signature, voice sample, fingerprint or other physiological sample to an analytical device in the terminal which produces the derivate defined as the password.) If the terminal verifies a match between the user-inputted password and the password stored on the card, the transaction is allowed to proceed. (For a physiologically derived password, the term "match" should be understood to mean an acceptable resemblance rather than an exact coincidence.) For maximum security, the password comparison should take place in the card itself; the terminal transmits the inputted password to the card and the logic on the card compares the inputted password with the stored password, and informs the terminal whether the correct password has been entered. The advantage of not allowing the password to "leave the card" for comparison in the terminal is that a thief cannot determine the stored password and therefore cannot use the card. Were the comparison to take place in the terminal, someone with a background in electronics could access the card password once it is stored in the terminal, and thus learn the correct password to be used with the card.

It is to be understood, of course, that purchase transactions are only one example of the use of intelligent cards. As is known in the art, intelligent cards can also be used to access data banks, make airlines reservations, decrypt at a terminal incoming messages which are transmitted in encrypted form, as well as for numerous other purposes. A novel use of an intelligent card is disclosed in my copending application Ser. No. 312,706, entitled "Electronic Document Authentication System" and filed on even date herewith, which application is hereby incorporated by reference. In general, the term "transaction" as used herein refers to any transaction effected by a terminal when a user intelligent card is inserted in it.

A major concern in the use of intelligent cards in this manner on a widespread scale is their possible susceptibility to fraud. When it is recognized that an intelligent card may allow its user to obtain hundreds and even thousands of dollars of credit, and in an extreme case even to obtain large amounts of cash or negotiable traveler's checks if a transaction terminal is provided for issuing cash or traveler's checks, it becomes apparent that card-controlled transaction terminals will not be commonplace until there is some way to protect against the fraudulent use of cards. It is a general object of my invention to provide such a protection system.

There are several different kinds of intelligent-card security which must be distinguished from each other. The first relates to the fraudulent issuance of genuine cards. A genuine card is one produced by an authorized manufacturer for delivery to a card issuer, the card issuer then initializing the cards, e.g., with a dollar value, and furnishing them to card users. The problem here is that genuine cards may be intercepted during shipment from the card manufacturer to the card issuer, or even stolen by dishonest employees of the card issuer. Techniques have already been developed for protecting against illegitimate issuance of genuine cards, and such a scheme is incorporated in the illustrative embodiment of the invention to be described in detail below.

The second aspect of card security relates to the use of a stolen card by a thief, a situation which will probably be commonplace. Secret password schemes have been devised in the prior art, as described above, to protect against the fraudulent use of a card in such a case. (Unfortunately, no way has yet been found to overcome a criminal forcing a card owner to tell him the password. Violent crimes of this type, however, occur much less frequently than attempted use of a stolen card. Moreover, there is just as great a risk in carrying cash as there is in carrying an intelligent card when it comes to violent crimes of this nature).

The problem which has thus far resisted solution concerns the criminal with a sophisticated electronics background. Such a criminal could actually manufacture intelligent cards and construct an issuer initialization terminal of his own. He could then actually initialize cards which could be used in transaction terminals of a legitimate card issuer. The problem is aggravated because a criminal with an electronics background need not even go to so much trouble.

It is expected that many transaction terminals will be unattended, that is, a card user will be able to effect a transaction in such a terminal without the terminal being attended by any personnel employed by the card issuer. There are already many such unattended terminals in place today, for example, those which allow the owner of a bank card to receive a packet of cash during nonbanking hours. It must be recalled that the basic protection scheme proposed in the prior art is the inputting of a password into the terminal by a card user, and the comparison of the inputted password in the card itself, with the card then informing the terminal whether the passwords match. Security can be completely broken by the simple expedient of inserting a specially-constructed card into the terminal. If the terminal is such that user cards are not completely absorbed and the ingress passage is not cut off, the card can be nothing more than a contact board (of card dimensions) being connected by a set of wires to an electronic "black box" carried on the person of the criminal. It is not necessary to even be concerned with the storage of a password in the "black box" which the criminal would, of course, know and input on the terminal keyboard. All the criminal has to do is to provide a signal to the terminal at the appropriate time which informs the terminal that the inputted password matches the password stored on the card. The terminal expects to receive a "yes" or a "no" answer and the electronic forger simply has to know how to furnish a "yes" answer when the terminal expects the result of the password comparison. The problem is obviously most severe in the case of unattended terminals where there is no one present to even check that what "looks" like a legitimate card is being placed in the terminal. In the case of a value card, for example, it would be a trivial matter for the forger's "black box" to inform the terminal that the card user has a considerable credit available to him.

One scheme has been proposed in the prior art for guarding against identification fraud. This scheme, which is marketed under the mark "Identikey", will be described in detail below. Its basic weakness is that it relies on a secret code transformation which is stored in each transaction terminal. With the proliferation of terminals, it will not be difficult for a forger to gain access to a terminal and to discover the secret transformation algorithm. As will become apparent below, once the transformation is determined a forger can varify his identity to the satisfaction of the terminal and possibly thereby gain access to privileges and services, although it is much more difficult for him to represent himself as a particular legitimate user.

In accordance with the principles of my invention, I provide a protection system for intelligent cards which is based in part on the principles of a new branch of cryptography known as "public-key cryptography". One of the earliest works on the subject is that of Diffie and Hellman, "New Directions In Cryptography", IEEE Transactions On Information Theory, November, 1976. Another significant advance in the field was described in the 1977 paper by Rivest, Shamir and Adleman, entitled "On Digital Signatures And Public-Key Cryptosystems", MIT/LCS/TM-82, of the Massachusetts Institute of Technology. Perhaps the clearest exposition of the subject is to be found in the August, 1979 issue of Scientific American, in an article by Hellman entitled "The Mathematics of Public-Key Cryptography".

SUMMARY OF THE INVENTION

A brief summary of public-key cryptography will be presented below, the details not being required for an understanding of the present invention. Most of the focus of cryptography has been on the transmission of a message from one site to another. The use of a public-key cryptosystem allows the message to be encrypted at site A in accordance with a published public key, transmitted to site B, and decrypted at site B in accordance with a secret private key. The key for decrypting the message is known only by the recipient at site B. There is no effective way to decrypt a message without the decrypting key even though the encrypting key is known, and the encrypted message is useless to anyone who gains unauthorized access to it. In an interesting twist to the basic concept, the use of certain public-key cryptosystems allows the message to be authenticated at site A, with the recipient at site B not only being guaranteed that the message is authentic but also being unable to generate fake messages purportedly transmitted from site A which could be alleged to be authentic.

In accordance with the principles of my invention, the card issuer first generates a public-key cryptosystem key pair E and D. The secret key D is stored in an initialization terminal which is guarded at the premises of the issuer. When a card is initialized, the user selects a password and it is stored in the card, as in the prior art. But another piece of information is also stored in the card. This information consists of two concatenated strings which are encrypted with the secret key D. One part of the string consists of the user's password, and the other part consists of a reference text which is used throughout the system. In the case of a card issuer such as the American Express Company, the reference text might simply be AMERICAN EXPRESS. Suppose, for example, that the user selects a password BIGSHOT3. Using the secret key D, the initialization terminal stores in the card an encryption of the concatenated string BIGSHOT3 AMERICAN EXPRESS.

Whenever the card is accessed by a transaction terminal, the user is asked for his password and, as in the prior art, the transaction is allowed to proceed only if the card informs the terminal that the inputted password matches the password stored in the card. As described above, this low level of security is not effective against a sophisticated forger. Much higher security is obtained, however, by requiring an additional two-part test to be executed by the terminal and card without any further action on the part of the user. The terminal retrieves from the card the data string which is the encryption of the concatenated password and reference text, e.g., the encryption of BIGSHOT3 AMERICAN EXPRESS. The terminal decrypts the string under control of the public key E which is stored in the terminal. For a legitimate card, there should result the concatenated string BIGSHOT3 AMERICAN EXPRESS. The terminal now performs two comparisons. The first part of the decrypted concatenated string is compared with the password which the user inputs on the terminal, and the reference text part of the decrypted string is compared with the reference text AMERICAN EXPRESS which is stored in the terminal. Only if both comparisons are successful is the transaction allowed to proceed to completion.

The protection against forgery depends on the inability of the forger to create both a password and an encrypted string which will pass this added test. It is assumed that a sophisticated forger will soon learn the reference text which is stored in every transaction terminal. He will also soon learn the public key E, perhaps by taking apart a transaction terminal. But without knowledge of the secret key D, there is no way in which a forger could devise a code which when inputted to the terminal from his forged card would, upon decryption with the public key stored in the terminal, result in a concatenated string consisting of both any password he might select and enter, and the predetermined text AMERICAN EXPRESS.

It is crucial to understand why the string stored in a card must be the encryption of both a user password unique to each user, and a reference text which is common to all of them. Suppose that it were required only to store in a card the encryption (using the issuer's secret private key) of a user-selected password. In such a case, the forger, knowing the public key used by each terminal for decryption, would create some arbitrary code for his card's encrypted string and use the public key to transform it into what he then defines as his password. He then simply need use the initial arbitrary code as the encrypted string furnished by his forged card to the terminal, and the previously determined decryption as the password which he inputs on the keyboard. There is no security at all in such a scheme.

On the other hand, suppose that it were required to store on each card only the string resulting from encryption of the reference text AMERICAN EXPRESS under control of the private key of the issuer. Since the same encrypted reference text is retrieved by the transaction terminal for every card used in the system, it is a trivial matter for the forger to learn what code his forged card should furnish to any terminal so that it will decrypt into the string AMERICAN EXPRESS.

The security of the present invention is precisely in its storage in the card of the encryption, using the issuer's private key, of a combination of a password unique to the user and a common reference text. It will no longer do the forger any good to start out with an arbitrary code. That arbitrary code (which the forger's unauthorized card would furnish to the terminal) must decrypt into two strings, one of which is the predetermined reference text AMERICAN EXPRESS. In accordance with the principles of public-key encryption, and assuming judiciously selected string lengths, the probability is infinitesimal of a forger selecting a random code which, when decrypted with the public key, has a predetermined substring in it. Were this to happen, the forger could look at the decrypted password/reference text combination, and see which password he would thereafter have to input to a terminal in order to effect both matches when his forged card inputs the random code which was tried in the first place. But the probability of an arbitrarily selected code being decrypted into a string, part of which is a predetermined reference text, is so negligible that the system is highly secure (certainly secure enough for commercial transactions.) The system is viable so long as the forger cannot determine the private key D which is the complement of the public key E stored in every transaction terminal. Without the private key, there is no technique of acceptable computational complexity which will specify a code which, when decrypted with the public key, will result in a string having a predetermined reference text as a substring. Even were some arbitrarily selected code decrypted into a string which would include as a part thereof the predetermined reference text AMERICAN EXPRESS, the predetermined reference text would have to occur in the right position in the overall decrypted password/reference text combination, and the probability of this happening is even more remote than that of guessing a code which will decrypt into an overall string which has the reference text AMERICAN EXPRESS in some arbitrary position.

It should be noted that this authentication system can serve a multiplicity of issuers. If each issuer has its own public-secret key pair and reference text, each card will carry the reference text or other identification of the issuer, and each transaction terminal will store the full set of acceptable issuer reference texts and public keys. For convenience, the card can also carry the appropriate public key, although this key, like the reference text, must be configured as a member of an acceptable set stored in the terminal. It is even possible for a single card to be shared by several issuers, containing several encrypted codewords, each corresponding to a particular issuer and controlling access to a value of eligibility stored in a particular section of the card's memory. Some identification of each issuer is necessary, and, just as with the single-issuer card, the issuer's reference text can serve this function. For convenience, each issuer's public key can also be carried in the card.

BRIEF DESCRIPTION OF THE DRAWINGS

Further objects, features and advantages of my invention will become apparent upon consideration of the following detailed description in conjunction with the drawing, in which:

FIG. 1 depicts the components utilized in a complete system of my invention;

FIG. 2 depicts the form of a terminal which may be used in the system of my invention;

FIGS. 3A and 3B depict respectively a prior art, unsatisfactory solution to the forgery problem and the higher security solution of my invention;

FIG. 7 is a flow chart which depicts the process of effecting a transaction with an intelligent card.

DESCRIPTION OF THE PREFERRED EMBODIMENT

Figure 4:
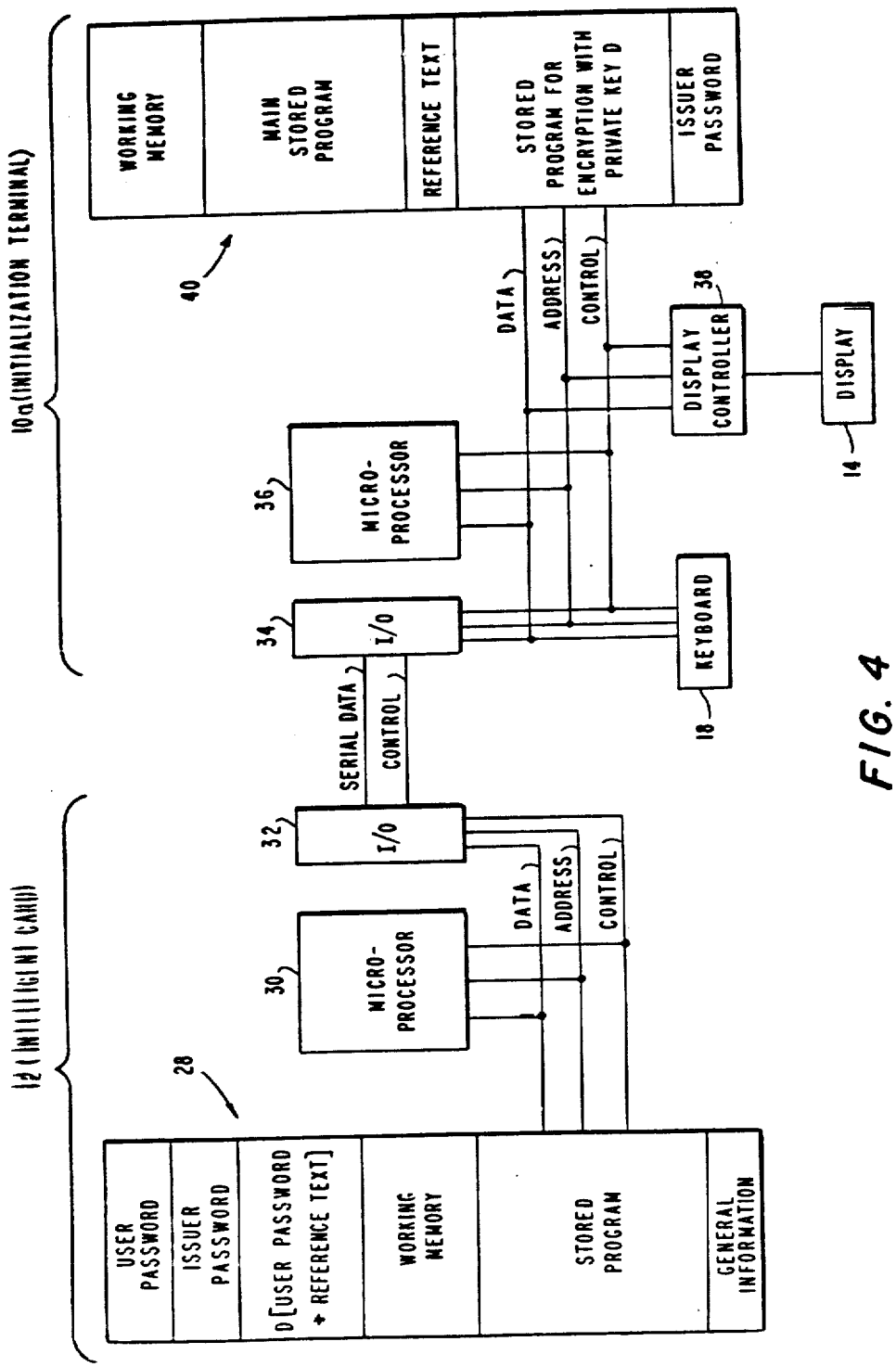
FIG. 4 symbolically depicts the details of both an intelligent card and an initialization terminal, as the latter is used to initialize the former.

Before proceeding to the detailed description of my invention, a brief summary of the principles of public-key cryptography will be presented. In its simplest form, and as originally contemplated for the transmission of messages over communications channels, each user computes or is issued a complementary pair of keys. The two keys are generally given the symbols E and D, and both are used to control operations on alphanumeric strings represented as numbers. In the well known Rivest-Shamir-Adleman (RSA) scheme, the two keys are commutative in the sense that if an original text is encrypted under control of key E, encryption of the encrypted text under control of key D will result in the original text, while encryptions first with key D and then with key E similarly result in the original text. The security of public-key systems resides in the extreme computational difficulty of deriving one key from the other.

In the usual case, a party to whom messages are to be sent publishes his key E in a central directory. Anyone who wishes to transmit a message to his transforms or encrypts the message with key E. Key D is known only to the party who can decrypt any incoming message for him with the use of this key. However, anyone else who gains access to the transmitted encrypted message will find it totally unintelligible because without key D, the transmitted message cannot be decrypted. The symbols E and D are generally used because one key is used for encryption and the other for decryption, although their roles can be exchanged, as has been noted above. Key E is referred to as the "public key" because it is published so that the whole world will know how to encrypt messages for secret transmittal to the owner of the key pair. Key D is the "private key" because it is known only to the individual owning the key pair.

If privacy is of no concern but instead authentication is the goal, the party who originates the message uses his private key to transform it. Thus it is his key D, which is ordinarily used for decryption, which is used to authenticate (encrypt) a message. The party receiving the encrypted message uses the public key E of the transmitter to decrypt the incoming message in order to transform it to the original text. As long as the incoming encrypted message is saved, the receiving party can "prove" that the received message is authentic. Using the public key of the transmitter to decrypt the incoming message results in an intelligible text only if the original message was encrypted with the private key of the transmitter. Since the transmitter is the only person who has knowledge of his private key, the receipt and storage of any incoming encrypted message which can be transformed to an intelligible text using the public key of the transmitter serves as proof that he indeed sent the message.

While encrypting a message with the public key of the receiver assures privacy, and encrypting a message with the private key of the transmitter assures authentication, in the former case there is no way to prove that an incoming message is authentic and in the latter case there is no way to control privacy. In the former case, there is no way for the receiver to know that the party from whom the message is supposed to have come really originated it because the whole world has access to the receiver's public key. In the latter case, since the whole world knows the public key of the transmitter, anyone can decrypt the transmitted message if access is gained to it. The way to insure both privacy and authentication is for the transmitter to doubly encrypt the message with his private key and the receiver's public key, and for the receiver to doubly decrypt the message with his private key and the transmitter's public key. Because of the commutative property of each key pair, the doubly-decrypted message will be the same as the original text prior to the double encryption. Privacy is assured because only the receiver has his private key which is necessary for partial decryption. Authentication is assured because, while the whole world has the public key of the transmitter, a transmitted message which can be decrypted into text which has meaning could only have been encrypted by the possessor of the transmitter's private key.

Because the transmitter can actually use his private key D for encryption purposes, with his public key E being used by a receiver for decryption, the symbols D and E do not necessarily always refer to decryption and encryption keys. Either can be used for encryption and either can be used for decryption. However, this is the symbology which has developed. What is common to any key pair in a "public-key cryptosystem" is that one key is public (or at least the key-pair owner does not really care if it becomes public) and one is private; the public key is referred to herein as the E key, and the private key is referred to herein as the D key. What is also common to all such cryptosystems is that neither key can be determined from the other.

In a public-key cryptosystem utilizing the RSA scheme, a message to be transmitted is first raised to the power S. The final encrypted message is the original message raised to the power S, modulo R. That is, only the remainder after the original message is raised to the power S and repeatedly divided by R is actually transmitted. The number R may be typically 300 bits in length, and the power S to which the original message is raised is typically 50 bits in length. The length of each message must, of course, be less than the length of R because the encrypted message must have at least as many bits as the original. The numbers S and R together comprise the published public key of a user. The private key comprises numbers T and R. The incoming message is raised to the power T, then repeatedly divided by the number R until the remainder is less than R. This remainder is the decrypted message.

The user keeps his private key secret, the number T being the important part of the secret since the number R is known. As described above, the reason that public-key cryptography works is that given the key S, it is virtually impossible to determine the key T. The literature referred to above describes not only the basis for public-key cryptography, but also the manner in which paired private and public keys can be generated.

FIG. 1 illustrates the basic components of a system constructed in accordance with the principles of my invention. The numeral 12 represents an intelligent card, one such card being issued to each user of the system. The contacts for allowing a terminal to access the card are depicted symbolically at the upper left corner of the card housing, the contacts extending through the housing to the memory and logic and/or microprocessor contained within the housing. Terminal 10a is the initialization terminal utilized by the card issuer; each user card must be initialized with, among other things, a user password.

The numeral 10b represents a transaction terminal which can be used, upon insertion of a user card, for effecting a transaction. The numeral 13 simply relates to how the transaction is recorded. The record can be stored on site, or it can be transmitted elsewhere. Similarly, it can be printed or even stored in the user card.

FIG. 2 depicts the general form of a terminal. The terminal can be either the initialization terminal 10a of FIG. 1, or the transaction terminal 10b of FIG. 1; the only difference would relate to the details of the processing which takes place, as will become apparent below. As shown in FIG. 2, the terminal includes a display 14 for displaying messages and instructions to the card user, a slot 16 in which a card 12 is inserted, and a keyboard 18. The keyboard is used both to input information necessary for the transaction, as well as for the inputting of a user password.

FIG. 3B depicts symbolically the manner in which the forgery of cards, or the "fooling" of a terminal (especially an unattended terminal), are prevented in accordance with the principles of my invention. My scheme is to be contrasted with a representative prior art scheme depicted in a similar fashion in FIG. 3A, this prior art scheme being marketed under the trademark "Identikey" and being familiar to those skilled in the art.

The "Identikey" system presently enjoys use in the banking industry. A user defines his own secret password and commits it to memory. The user is also provided with two additional numbers, both of which can be recorded on an identification card—his account number and his identification number. The latter two numbers are non-secret, not in the sense that a public record is made of them although one or both may actually be printed on the user's card, but rather in that it is generally not possible to prevent at least a bank teller from learning the two numbers. It must therefore be assumed that the two numbers are not secret.

When user identity is to be established so that a transaction can be effected, the user's account number is inputted from his card (or manually), and the user inputs his password into the terminal by use of a keyboard. (As a first-level measure of security, the terminal may transmit the password to the card and only after the card informs the terminal that there is a password match does the terminal access the account number from the card.) The terminal then performs a nonlinear and effectively irreversible transformation on the combination of the password and the account number, and produces a test identification number. The user's identification number is also entered into the terminal, either by transfer from his card or by manual entry. Only if the identification number stored on the card matches the test identification number generated in the terminal does the terminal allow the transaction to be effected. The drawing shows the comparison of the two identification numbers as controlling either acceptance of the card and completion of the transaction, or rejection of the card (and possibly its destruction and/or confiscation).

It is assumed that the transformation F is irreversible in the sense that if the identification number of a user is known and his account number is also known, knowledge of the transformation F will not be sufficient to enable even the mathematically inclined to determine the password which is associated with the card. Thus a thief, for example, even if he knows the identification number and the account number of a user, will not be able to determine his password.

However, the system lacks security, assuming that the use of the transaction terminals are widespread, because there is no way to prevent general knowledge of the transformation F. All that a forger has to do is to select an arbitrary password and an arbitrary account number, and to use the transformation F on them to derive an identification number. He then can enter the arbitrary account number and derived identification number into any terminal to establish his identity. This does not, of course, allow the forger to misrepresent himself as a specific individual who has already been assigned account and identification numbers. In order to impersonate this individual, the forger must generate a password consistent with the known account and identification numbers. Certain limitations of the system make this easier than inverting the function F, but it is still a computationally expensive task. For these reasons, the "Identikey" system offers acceptable security in on-line applications in which the set of valid identification numbers is available for reference, but not in off-line applications where there is no such reference set.

In the system of my invention depicted in FIG. 3B, the user is provided with a secret password as well as a non-secret identification number. The identification number is the code on the card stored by the initialization terminal, i.e., the combination of the user-selected secret password and the reference text AMERICAN EXPRESS, encrypted together under control of the issuer's private key. Using the associated public key E stored in the terminal, the user's identification number is decrypted into two strings consisting of his password and the text AMERICAN EXPRESS. The terminal requests the user to input his secret password. (Once again, the terminal may access the card only after the correct password is inputted, as in the prior art.) The terminal then compares the inputted password and the universally-used reference text AMERICAN EXPRESS with the two parts of the decrypted identification number. Only if the two parts match does the terminal proceed to effect a transaction.

Just as a sophisticated forger is assumed to know the transformation F of FIG. 3A, he is assumed to know the public key E of FIG. 3B since there will be many transaction terminals in the field and it is a relatively simple matter to learn the public key. Suppose that the forger tries to do with the system of FIG. 3B something comparable to what he can do with the system of FIG. 3A, namely, to select an arbitrary identification number, to decrypt it using the known public key E, and to then use the decrypted results in creating a "black box" or forged card which can fool a transaction terminal. A terminal can be "fooled" only if the decryption results in a password and the message text AMERICAN EXPRESS. Should an arbitrarily selected identification number, after decryption with the public key E, indeed result in the message text AMERICAN EXPRESS in the proper place (e.g., at the end) and some additional arbitrary combination of letters and numerals, this latter combination would be the password which the forger could then use in his "black box" or to input on the keyboard. But the arbitrary selection of an identification number would have an infinitesimal probability of its decryption consisting of the predetermined message text in the right place, together with some arbitrary combination of characters. Thus knowing the public key E is not sufficient to allow a forger to select an identification number (the combination of a password and the message text AMERICAN EXPRESS, as encrypted by the secret key of the issuer) which will effect a transaction. The only way that an identification number can be selected which will decrypt with the public key into a password part and a predetermined message text part is if the private key is used in the encryption process, and the forger has no way of knowing the private key.

It is essential that the result of the decryption consist of both a password part and a predetermined reference text part. Were the encryption stored on the card to consist of a password only, the forger could select an arbitrary identification number, decrypt it with the public key E, and use the result as his password; storage of the arbitrarily selected identification number in the "black box" to be used with a terminal as the encrypted code on a card would always result in a successful comparison were the forger to input the password derived by using the public key E. Similarly, were the code on the card to consist of nothing more than the message text AMERICAN EXPRESS encrypted with the private key D, all the forger would have to do is to determine the same encryption which is stored on every card and to use it in his "black box". Decryption in any terminal with the public key E would necessarily result in the reference text AMERICAN EXPRESS. What is necessary for security is to store in a card the code which is an encryption, created with the private key D, of a combination of a password and a predetermined reference text. There is no way—even with knowledge of the public key E—that a forger can select an arbitrary identification number, or encryption to be stored on a card, which will decrypt into some arbitrary password together with the predetermined reference text in the correct position in the concatenated strings.

FIG. 4 depicts on the left side the components included in the intelligent card 12 itself. These components are shown in block-diagram form only since the constructions of intelligent cards are well known in the art. Memory 28 is divided into six segments. One segment of the memory includes the user password. This password is selected by the user (so that he can remember it), is stored in the card by the issuer's initialization terminal, and is subsequently used under control of any transaction terminal to verify that the individual using the card is the authorized user by requiring that the password which he inputs matches that stored in the card.

The memory also includes an issuer password. This is a password which the card manufacturer stores in the card, the password being known only to the manufacturer and the issuer. As will become apparent below, a card stolen from the manufacturer cannot be initialized by a thief because he will usually not know the issuer password which an initialization terminal requires in order to initialize any user card.

The next segment of the memory contains a code which is an encryption of a concatenation of two strings, one being the user password and the other being a reference text such as AMERICAN EXPRESS. The issuer's private key D is usd to encrypt the concatenated strings in the issuer's initialization terminal.

The "stored program" is simply the object code which governs operation of microprocessor 30. That segment of the memory which contains "general information" is optional, but can include information to be appended as part of the header of any transaction message which is generated. For example, it might contain the name and address of the user.

The five segments of memory 28 described thus far can be read-only-memory in that after the card is initialized, the information contained in these segments of the memory need never be changed. (Certain portions of the read-only-memory, such as the stored program, may be written by the card manufacturer, while other portions of the memory may be written into only once by the initialization terminal; typically, the password, code encryption and general information segments may comprise the contents of PROM memory.) The only part of the memory which need be random-access is the "working memory", that part of the memory which is used by the microprocessor during processing. Although not shown in the drawing, it is to be understood that the slot into which the card is inserted in either type of terminal includes pins for furnishing power to mating pins on the card. Typically, the card requires two sources of power—five volts for powering on-board TTL logic or the microprocessor, and 24 volts for writing into the PROM segments of memory 28, as is known in the art. (The transaction terminal, to be described below, need not furnish 24-volt power.)

The card also includes an I/O section 32 for interfacing with a terminal 10. A principal function of the I/O section is parallel to serial conversion. A single pin on the card is used for transmitting and receiving serial data. A set of control lines is provided for allowing timing and control information to be transmitted back and forth between the card and the terminal.

The card also includes conventional data, address and control busses for interconnecting the microprocessor, the memory and the I/O sub-systems.

The initialization terinal 10a of FIG. 4 similarly includes an I/O section 34, a microprocessor 36 and a memory 40, all interconnected by conventional data, address and control busses. Keyboard 18 is connected to the three busses so that a user password can be entered, as well as for entering any other general information which may be desired. The display 14 of the terminal is interfaced to the three busses by a conventional display controller 38, as is known in the art.

Memory 40 contains five types of information. The working memory is random-access and is the memory required by the microprocessor during processing. The other four segments of the memory can be read-only memory. The main stored program controls most of the processing to be described below. The portion of the memory labelled "reference text" contains the phrase AMERICAN EXPRESS as used in the example above, the reference text which is used as one part of the concatenation which is encrypted with the private key D. There is an additional stored program for encrypting the combination of the user-selected password and the fixed message text with the issuer's private key D. (Strictly speaking, this part of the memory simply contains one of many subroutines and can be considered to be part of the main stored program.) The memory 40 also contains the issuer password whose function will be described shortly.

Figure 6:
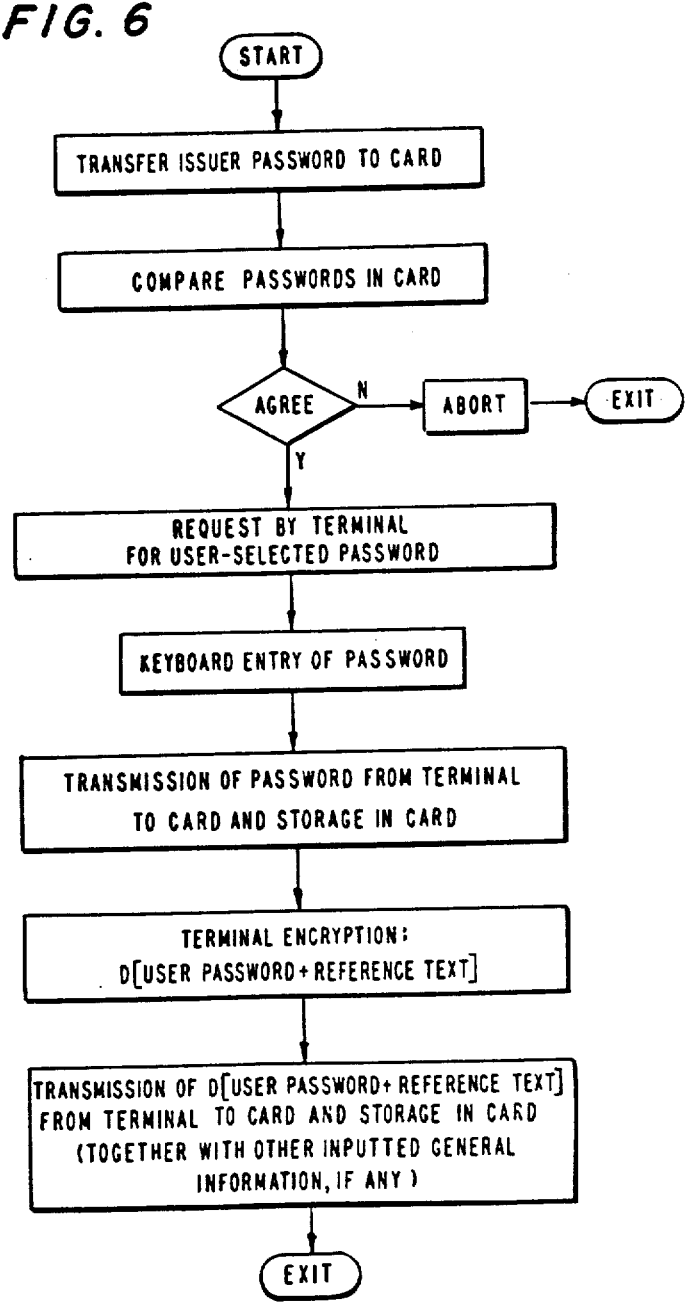
FIG. 6 is a flow chart which depicts the card initialization process.

The manner in which a user card is initialized is depicted in the flow chart of FIG. 6. (The actual object code for carrying out the initialization process is not shown in the drawing since, given the flow chart, anyone skilled in the art could write a source program which, after assembly, would provide object coce for controlling the microprocessor.) At the start of the initialization process, after the user card is inserted in the card slot of the initialization terminal, the terminal reads the issuer password from its memory and transmits it to the card. The issuer password which is thus transmitted to the card is compared by microprocessor 30 with the issuer password stored in the card memory. The result of the comparison is transmitted to the terminal. If the two passwords do not agree, the initialization process is aborted; otherwise, it continues as shown in the flow chart.

This comparison of passwords is standard in the art of intelligent cards. The card manufacturer stores a different issuer password on each serially-numbered card which it manufactures. Without this security step, were a truckload of cards to be highjacked, a thief could initialize and use them. What the manufacturer does is to send the list of issuer passwords corresponding to the serially-numbered cards to the card issuer via some alternative and highly secured channel. In this way, the highjacker of a truckload of cards cannot make use of them because he does not know the issuer passwords which are required to initialize the cards.

Referring back to FIG. 6, the terminal then requests, via display 14 on the initialization terminal, that the user enter a password. The user is allowed to select his own password so that he will choose one which he is not likely to forget. The password is then transmitted to the card, and stored in memory 28 as the user password.

The terminal then uses the private key D to encrypt a message which has two parts: the previously inputted user password and the predetermined reference text, the same reference text being used in the encryption of each card to be initialized. The priviate key D which is used is the private key which is associated with the public key of a public-key cryptosystem key pair. (Techniques for generating paired public and private keys are well known in the art, all that is required for an understanding of the present invention being the appreciation of how such a key pair is used.) The encrypted string concatenation is then sent from the terminal to the card and stored in the card, together with any other general information which may be entered via the keyboard such as the user's name and address.

Figure 5:
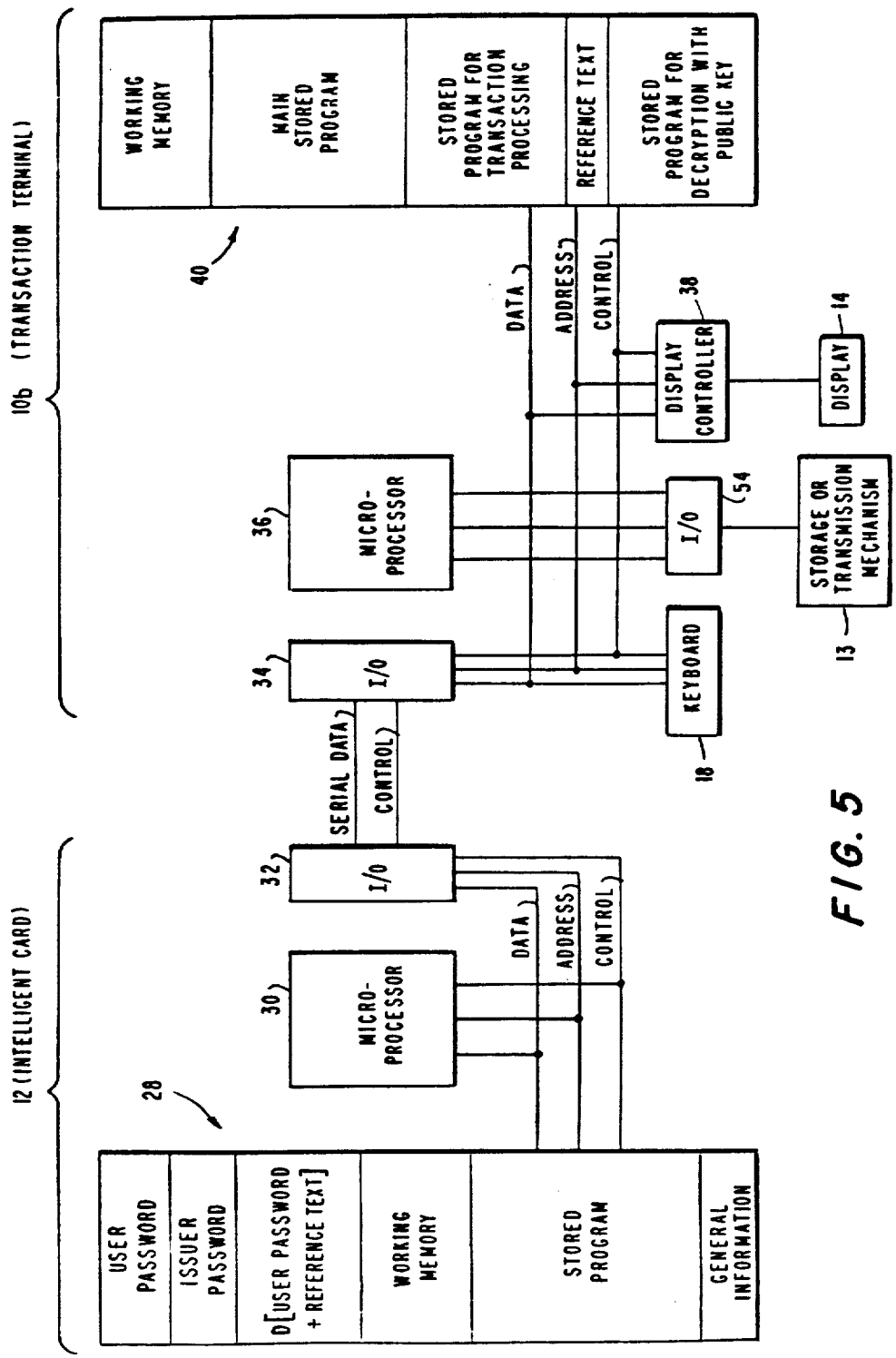
FIG. 5 symbolically depicts the details of an intelligent card and a transaction terminal, as the latter is used to effect a transaction under control of the former.

The intelligent card 12 is also shown in FIG. 5, this time interfacing with transaction terminal 10b. The card itself is the same as the card shown in FIG. 4 and it interfaces with the terminal in the same way. The transaction terminal 10b contains the same basic components as does initialization terminal 10a in FIG. 4. The major difference is that the transaction terminal includes an additional storage or transmission mechanism 14, together with an I/O circuit 54 which connects it to the three system busses. As described above in connection with FIG. 1, a record representative of a transaction is stored, transmitted, printed, etc. Memory 40 of the transaction terminal is, of course, different from the comparable memory in the initialization terminal since different functions must be performed. The transaction terminal includes a working memory and a main stored program. As part of the program there is a subroutine for controlling a public-key decryption of the encrypted code stored on any user card accessed by the terminal. This is the subroutine which decrypts the encrypted concatenated string on the user card to derive password and reference text parts. Memory 40 also includes a segment which stores the universal reference text, e.g., AMERICAN EXPRESS, so that the terminal can verify that the decryption has two parts which match respectively the keyboard-inputted user password and the universal message text. Memory 40 also includes, of course, a stored program for actually effecting a transaction of interest after it is determined that a card has been inserted in the machine by the legitimate bearer of an authorized card.

FIG. 7 depicts the flow chart which characterizes operation of a transaction terminal. The first step involves inputting of the password by the card owner. Because card owners often input their respective passwords incorrectly, a card owner is given four attempts to key in his password in the correct manner. A count j is set equal to one and the terminal then requests, via the display, that the user input his password. The terminal then transmits the inputted password to the card where it is compared with the stored user password. The comparison is best performed on the card, rather than in the terminal, for security purposes so that there is no way for someone who has tampered with the terminal to gain access to the user password. If the inputted password does not agree with that on the card, count j is incremented, and it is then compared with a maximum count of five. If j equals five, it is an indication that a user has attempted to input a correct password four times and has failed. It is therefore assumed that he is not the card owner, and the whole process is aborted as shown in the flow chart of FIG. 7. On the other hand, if he has inadvertently entered the wrong password, he is given another three chances to get it right. As long as the correct password of the card user is entered correctly within four attempts, the processing continues.

The terminal then controls the card to transmit to it the encryption of the combined user password and predetermined reference text which is stored on the card. The public key E is then used in the terminal to decrypt the encrypted code stored in the card, and the result should be a concatenation of the user password and the reference text AMERICAN EXPRESS, as described above. The first part of the decryption, the user password part, is compared with the inputted password to see if they agree. If they do not, the processing is aborted. If they do agree, the terminal then compares the decrypted message-text part with the predetermined reference text which is stored in the terminal, AMERICAN EXPRESS. Once again, if there is disagreement the transaction is aborted. The transaction is completed only if both parts of the decrypted encrypted code agree respectively with the secret user password inputted by the user and the predetermined reference text.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. A system for allowing authorized users of portable intelligent cards to effect transactions via at least one transaction terminal comprising a plurality of user intelligent cards each having stored therein a code which is the encryption of a combination of a password associated with the respective user and a reference text which is common to all users, the codes stored in all of said cards having been encrypted with the same private key which is associated with the public key of a public-key cryptosystem pair; and at least one transaction terminal having means for allowing a card user to inut a password, and means for controlling (1) the retrieval of the code stored in an inserted card, (2) the decryption of the retrieved code with the use of said public key to derive a password part and a text part, (3) the comparisons of the derived password part with the inputted password, and the text part with said common reference text, and (4) the effecting of a transaction only if both of said comparisons are successful.

2. A system in accordance with claim 1 wherein each of said cards further includes means for storing the respective password by itself; and means for accepting a password furnished by said at least one terminal, and for comparing the furnished password with the stored password; said terminal controlling means controlling the retrieval of the code stored in an inserted card only in the event the password comparison is successful.

3. A system in accordance with claim 2 having a plurality of transaction terminals, at least one of which is unattended.

4. A system in accordance with claim 3 further including at least one terminal for initializing a user intelligent card, said initializing terminal having means for assigning a password to a user whose card is to be initialized, means for deriving a code by encrypting with said private key the combination of the assigned password and said common reference text, and means for controlling the storage in said card of said derived code.

5. A system in accordance with claim 2 further including at least one terminal for initializing a user intelligent card, said initializing terminal having means for assigning a password to a user whose card is to be initialized, means for deriving a code by encrypting with said private key the combination of the assigned password and said common reference text, and means for controlling the storage in said card of said derived code.

6. A system in accordance with claim 1 having a plurality of transaction terminals, at least one of which is unattended.

7. A system in accordance with claim 6 further including at least one terminal for initializing a user intelligent card, said initializing terminal having means for assigning a password to a user whose card is to be initialized, means for deriving a code by encrypting with said private key the combination of the assigned password and said common reference text, and means for controlling the storage in said card of said derived code.

8. A system in accordance with claim 1 further including at least one terminal for initializing a user intelligent card, said initializing terminal having means for assigning a password to a user whose card is to be initialized, means for deriving a code by encrypting with said private key the combination of the assigned password and said common reference text, and means for controlling the storage in said card of said derived code.

9. A system in accordance with claim 8 wherein said initializing terminal further controls the separate storage in said card of the assigned password.

10. A terminal for initializing portable intelligent cards to be used with at least one transaction terminal, each intelligent card having a memory therein, comprising means for assigning a password to a user whose card is to be initialized, means for deriving a code which is the encryption of a combination of the assigned password and a reference text which is common to all users, the code for each user being derived with use of the same private key which is associated with the public key of a public-key cryptosystem pair, and means for controlling the storage in a user card of the respective derived code.

11. An initializing terminal in accordance with claim 10 further including means for controlling the separate storage in a user card of the respective assigned password.

12. A portable intelligent card for use in effecting transactions via at least one transaction terminal comprising a housing, a memory within said housing for storing a code, said code being the encryption of a combination of a password associated with the respective card user and a reference text which is common to all other users of like cards, said code having been encrypted with the private key which is associated with the public key of a public key cryptosystem pair, and means for allowing said stored code to be accessed externally of the card.

13. A portable intelligent card in accordance with claim 12 wherein said memory further separately stores said password.

14. A portable intelligent card in accordance with claim 13 further including means for accepting a password to be compared with the stored password and for comparing them.

15. A portable intelligent card in accordance with claim 14 further including means for controlling the outputting of said stored code.

16. A portable intelligent card in accordance with claim 15 wherein said stored code is outputted only if said comparison is successful.

17. A portable intelligent card in accordance with claim 12 further including means for controlling the outputting of said stored code.

18. A portable intelligent card in accordance with claim 12 wherein said memory stores a plurality of codes each associated with a different service provider.

19. A portable intelligent card in accordance with claim 18 wherein said memory stores associated with each of said plurality of codes an identification of the respective service provider.

* * * * *